US010268453B1

(12) United States Patent
Ong et al.

(10) Patent No.: US 10,268,453 B1
(45) Date of Patent: Apr. 23, 2019

(54) INTERFACING WITH ONE OR MORE INTELLIGENT SYSTEMS

(71) Applicant: The United States of America as Represented by the Administrator of the National Aeronautics and Space Administration, Washington, DC (US)

(72) Inventors: James Ong, San Carlos, CA (US); Emilio Remolina, Dublin, CA (US); Peter I. Robinson, Palo Alto, CA (US)

(73) Assignee: United States of America as Represented by the Administrator of the NASA, Washington, DC (US)

( * ) Notice: Subject to any disclaimer, the term of this patent is extended or adjusted under 35 U.S.C. 154(b) by 158 days.

(21) Appl. No.: 15/063,147

(22) Filed: Mar. 7, 2016

(51) Int. Cl.
   *G06F 8/20* (2018.01)
   *G06F 8/35* (2018.01)
   *G06F 8/33* (2018.01)

(52) U.S. Cl.
   CPC .................. *G06F 8/20* (2013.01); *G06F 8/33* (2013.01); *G06F 8/35* (2013.01)

(58) Field of Classification Search
   None
   See application file for complete search history.

(56) References Cited

U.S. PATENT DOCUMENTS

| 7,721,279 B1* | 5/2010 | Caufield | G06F 8/71 |
| | | | 717/168 |
| 2005/0055689 A1* | 3/2005 | Abfalter | G06F 8/61 |
| | | | 717/174 |
| 2005/0132351 A1* | 6/2005 | Randall | G06F 11/1433 |
| | | | 717/168 |
| 2005/0166094 A1* | 7/2005 | Blackwell | G06F 11/3664 |
| | | | 714/38.14 |
| 2006/0005193 A1* | 1/2006 | Illowsky | G06F 1/3203 |
| | | | 718/100 |
| 2008/0071716 A1* | 3/2008 | Anderson | G06N 5/04 |
| | | | 706/45 |
| 2008/0168529 A1* | 7/2008 | Anderson | G06F 21/577 |
| | | | 726/1 |
| 2008/0250273 A1* | 10/2008 | Yilmaz | G06F 11/3636 |
| | | | 714/38.14 |
| 2009/0077422 A1* | 3/2009 | Khaladkar | G06F 11/3684 |
| | | | 714/33 |
| 2015/0301804 A1* | 10/2015 | Dunne | G06Q 10/06 |
| | | | 717/101 |

(Continued)

OTHER PUBLICATIONS

Smith et al., The ANML Language, Dec. 2009, 8 pages.*

(Continued)

*Primary Examiner* — Lewis A Bullock, Jr.
*Assistant Examiner* — Tina Huynh
(74) *Attorney, Agent, or Firm* — Rhys W. Cheung; Robert M. Padilla; Mark P. Dvorscak

(57) ABSTRACT

A method of communicating between one or more modules while executing a plan for a controlled system includes transmitting, by an execution manager, a request to a planner to create a plan in response to receiving a planning goals file. The method also includes transmitting, by the execution manager, the created plan to an adaptive controller for execution of the created plan within a controlled system, and receiving, by the execution manager, state estimates reporting diagnosis information of a controlled system.

21 Claims, 11 Drawing Sheets

(56) References Cited

U.S. PATENT DOCUMENTS

2015/0339582 A1* 11/2015 Riabov .................... G06N 5/04
                                                            706/11
2016/0321544 A1* 11/2016 Hassanzadeh ......... G06N 5/022
2017/0147923 A1*  5/2017 Riabov .................... G06N 5/02
2017/0153967 A1*  6/2017 Kalech ................ G06F 11/3672

OTHER PUBLICATIONS

Barreiro et al., Europa A Platform for AI Planning, Scheduling, Constraint Programming, and Optimization, May 2012, 14 pages.*
James Ong et al., "Software Testbed for Developing and Evaluating Integrated Autonomous Systems", IEEE Aerospace Conference in Big Sky, MT, Mar. 7-14.

* cited by examiner

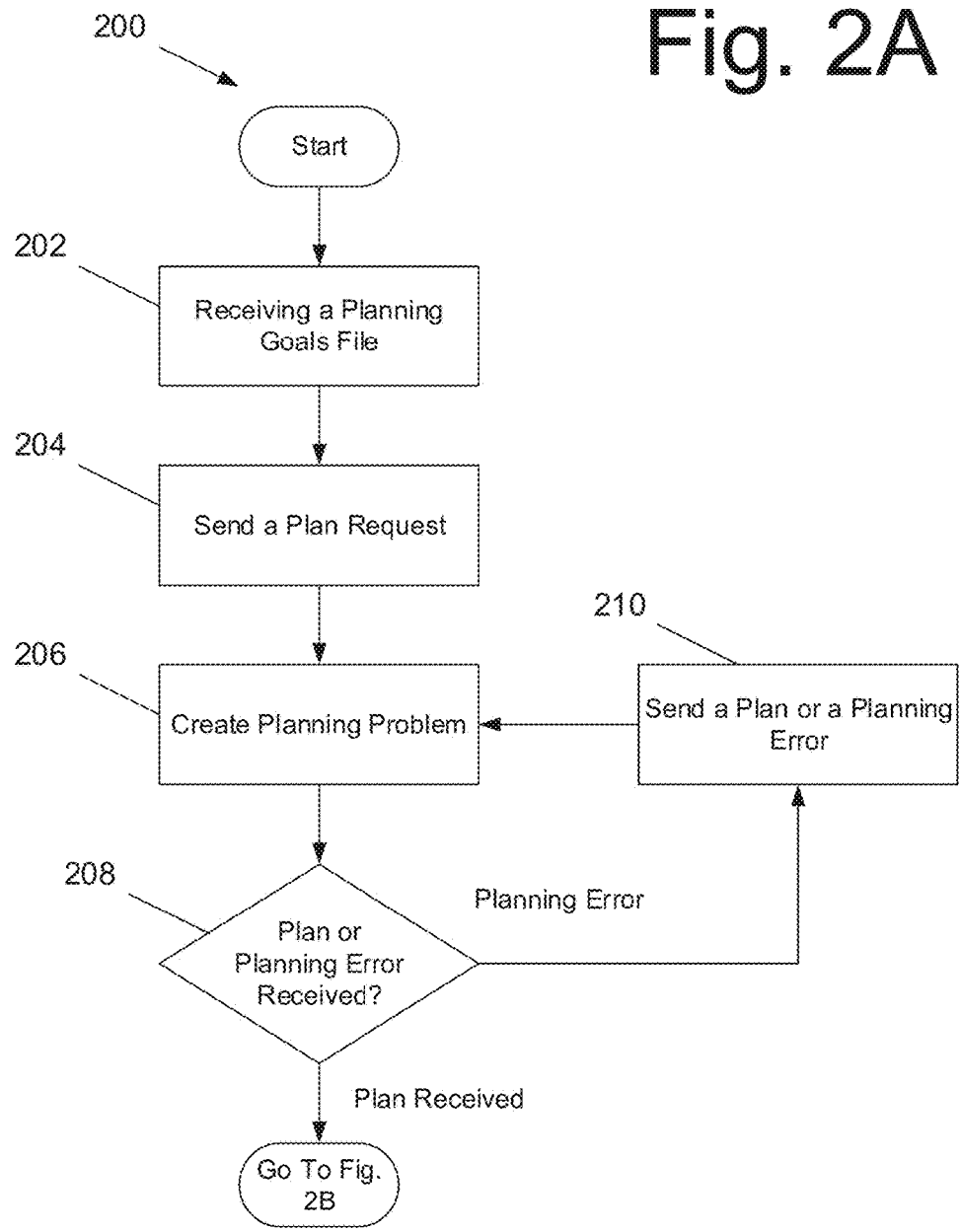

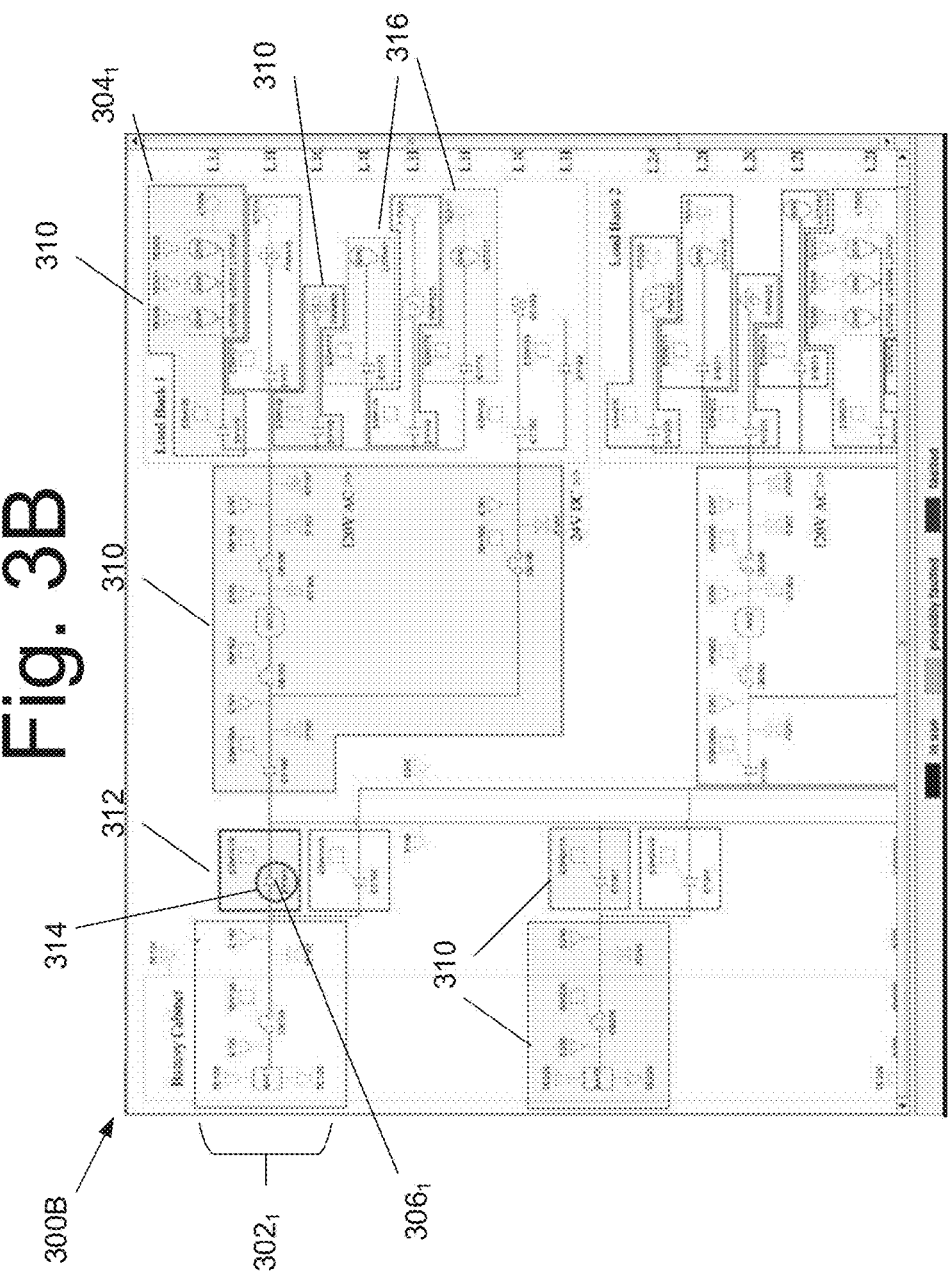

400

INTERFACING WITH ONE OR MORE INTELLIGENT SYSTEMS

ORIGIN OF THE INVENTION

The invention described herein was made by one or more employees of the United States Government and may be manufactured and used by or for the Government of the United States of America for governmental purposes without the payment of any royalties thereon or therefor.

FIELD

The present invention generally relates to an autonomous system, and more particularly, to a software application that supports development and evaluation of operational or experimental goal-based integrated intelligent software systems and/or subsystems.

BACKGROUND

Autonomous systems can use planning systems to select, configure, and schedule actions that perform tasks and achieve or maintain certain conditions in order to meet a set of conjunctive goals. Adaptive control systems execute plans using conditional logic to adjust how actions are performed in particular situations in order to attempt to meet the goals through the selected sets of plans and their actions. Diagnostic systems detect faults and other types of problems that can reduce system capabilities and capacities. When these problems occur, the autonomous system must adapt by generating and executing a new plan, requiring coordination among the planning, execution, and diagnosis subsystems.

Developing and maintaining interfaces between each autonomous system component by hand is time-consuming and error-prone. The various diagnosis, planning, and execution subsystems operate using their respective knowledge bases and data models, which encode assumptions about the system's configuration, state, and operating procedures, sometimes in subtle ways. Because the subsystems use different models, subsystem interfaces must translate between these models. Changes in system state, system configuration, operating rules, and other assumptions can require revisions to both the models and subsystem interfaces.

Accordingly, an improved approach may be beneficial.

SUMMARY

Certain embodiments of the present invention may provide solutions to the problems and needs in the art that have not yet been fully identified, appreciated, or solved by current autonomous system. For example, some embodiments pertain to a process of communicating between one or more modules while executing a plan for a controlled system.

In an embodiment, a computer-implemented process may include transmitting, by an execution manager, a request to a planner to create a plan in response to receiving one or more goals from a user interface, one or more state estimates from a state estimator, or both. The computer-implemented process may also include transmitting, by the execution manager, the created plan to an adaptive controller for execution of the created plan within a controlled system. The computer-implemented process may further include receiving, by the execution manager, the one or more state estimates reporting diagnosis information of a controlled system.

In another embodiment, an apparatus may include at least one processor and memory comprising a set of instructions. The set of instructions with the at least one processor may cause the execution manager to transmit a request to a planner to create a plan in response to receiving one or more goals from a user interface, one or more state estimates from a state estimator, or both, and transmit the created plan to an adaptive controller for execution of the created plan within a controlled system. The set of instructions with the at least one processor may further cause the execution manager to receive the one or more state estimates reporting diagnosis information of a controlled system.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 2A-2D are flow diagrams illustrating a process 200 for executing a plan, according to an embodiment of the present invention.

FIG. 3B is a graphical user interface 300B illustrating polygons that group components associated with each planning resource, overlaid over the schematic diagram of the controlled system, according to an embodiment of the present invention.

DETAILED DESCRIPTION OF THE EMBODIMENTS

Figure 6:
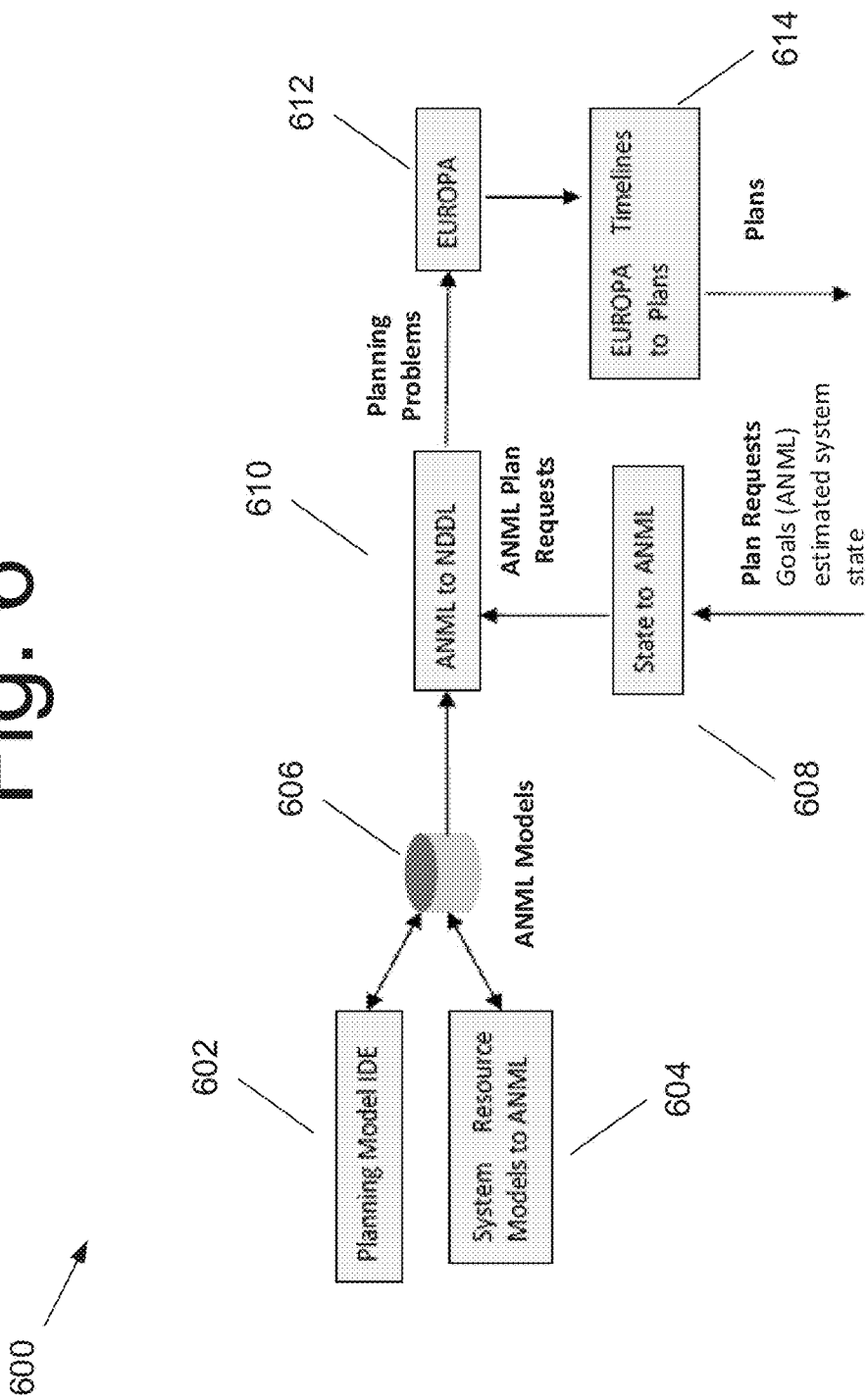
FIG. 6 is a block diagram illustrating a planning subsystem 600, according to an embodiment of the present invention.

A planning system generally uses a heuristic search to select, configure, and schedule actions that perform tasks and achieve or maintain state conditions requested by users (also known as goals or reference signals). A model-based planning system may receive a problem statement and a planning domain model, both expressed in a planning domain modeling language such as the New Domain Definition Language (NDDL) or an Action Notation Modeling Language (ANML). See, for example, FIG. 6. The problem statement may specify the state of the world during the planning period, the tasks to be carried out, desired goal states to be achieved, and additional requirements such as deadlines for completing tasks or achieving goal states. The planning domain model may specify the world knowledge needed by the planner. Many planning domain languages, such as ANML, encode this world knowledge as a library of actions, their effects on the world, and the conditions that must be true in order for the action to be executed. The planning system may output a plan specifying actions to be performed, timing for each action, and the resources assigned to support each action. In some embodiments, the planning system may output more than one plan, which may be executed at a later time.

It should be appreciated that in planning, a resource may be one of the factors that is necessary to carry out activities at any level, including actions. Example of resources may include, but is not limited to, durable objects such as equipment and facilities, consumables such as material or energy, labor or personnel, space or land, or logical entities such as access rights or permissions. Resources may be defined in some embodiments in terms of capacities (e.g., electrical power or bandwidth), and may be represented by stock variables, such as energy, or flow variables, such as power. Resources may be consumed (e.g., input materials, energy, etc.) or reused (e.g., use of a tool). By way of example, planning domain models may include resources whose quantity or availability is sufficiently limited, relative to demand, so that effective resource allocation enables better plans.

An adaptive controller may execute each action in the plan by selecting a procedure, which includes sending a sequence of commands to the controlled system. The adaptive controller may also use conditional logic to modify the selection or sequencing of commands, adjusting how actions are performed in particular situations. The adaptive controller may also monitor sensed variables during execution to confirm the successful achievement of target state conditions or the completion of planned actions. If execution problems occur, e.g., one or more errors between the goals and the current conditions is greater than acceptable, the adaptive controller may report these problems to a human operator and/or the automated execution manager.

A state estimation system (or state estimator) may execute the past, present, and/or future state of the controlled system and the world based on an analysis of sensor data, commands, and other information. The state estimation system may also diagnostic functions, which analyze sensor readings, commands, and other data, identifying faulty components and their fault states. The state estimation system may further provide prognostics that estimate the type and timing of future failures. The state estimation system may in certain embodiments estimate when damaged parts of the controlled system will be repaired and can resume operations. The state estimation system may in some embodiments provide a ranked set of state estimates, e.g., the best one is used by Intelliface. In additional embodiments, Intelliface could reference more than one of the ranked state estimates in order to perform its function.

Fault tolerant autonomy requires the integration of the planning, adaptive control, and state estimation functions. For example, diagnostic systems and/or the state estimation system may analyze sensor readings, commands, and other data to identify the both the nominal and off-nominal elements of the state vector (e.g. faulty components and their fault states). When the diagnosis function identifies a failure or degradation in a system component, the planning function determines whether the available resources can support current plans, and if the available resources cannot support the current plans, then the planning function determines how the plans should be revised.

Determining how best to model resources for planning is challenging because the model must include those resources that are directly used by activities as well as resources required only indirectly. For example, suppose that a cooling activity requires the operation of a device such as a pump, then in that case, the user may model the pump, in combination with a coolant loop, as a resource to provide a thermal control capability.

However, in order to operate the pump, the pump requires a power resource. To access this power source, one or more electrical connections in series through the power distribution system are required between the power storage and the pumps. In addition, command and data handling are necessary to monitor and control the equipment and to configure the electrical path. Thus, this cooling activity requires a pump, coolant loop, power source, electrical distribution, and command and data handling resources. A person of ordinary skill in the art would readily appreciate that these dependencies may usually be defined in the schematics of the controlled system.

Changes in operating rules, system configuration, usage patterns, and other assumptions can require revisions to the planning domain model. For example, if the supply of a resource decreases or if the demand for the resource increases, a resource that was once plentiful (and possibly not modeled) may become limited, relative to the demand. In this case, the planning domain model may have to be revised, so the planner can reason about the availability and consumption of this resource and ensure that plans allocate their use effectively.

Typically, the diagnosis, planning, execution, and diagnosis subsystems use different models of the system, so integration usually requires translation between models—syntactic integration and semantic integration. Syntactic integration pertains to the grammar of communication and semantic integration pertains to content of the grammar. It should be appreciated that there is often a duplication of candidate domain constraints between the different models. For example, the diagnosis function normally identifies physical (e.g., hardware) or logical (e.g., data, software) components that require repair. By contrast, planning and scheduling systems use resource models that are only as detailed as is necessary to support the correct selection, scheduling, and execution of planned actions. In practice, planning resources are often modeled more abstractly and coarsely than the components identified by the diagnosis function.

Developing and maintaining these interfaces by hand is time-consuming and error-prone. The various subsystems rely upon their respective knowledge bases and data models, which encode assumptions about the system's configuration, state, and operating procedures, sometimes in subtle ways. Because the diagnosis, planning, and execution systems use different models, interfaces among these subsystems must translate between these models. Changes in system state, system configuration, operating rules, and other assumptions can require revisions to the models and interfaces. Implementing these revisions to the models and interfaces is labor-intensive and can be error-prone because assumptions that underlie the modeling decisions can be subtle and implicit. Thus, it is easy to make incorrect changes to these models that violate these unstated assumptions.

Some embodiments of the present invention generally pertain to software application(s) that help users develop robust interfaces among planning, execution, and diagnosis systems more quickly and consistently. Specifically, some embodiments generally pertain to a testbed for developing, demonstrating, and evaluating experimental autonomous systems (or controlled system). In an embodiment, an Intelliface/ADAPT may control the Advanced Diagnostics and Prognostics Testbed ("ADAPT"), which was developed by NASA Ames Research Center. ADAPT may be considered a controlled system in some embodiments.

In a separate embodiment, Intelliface/CTB may demonstrate how a system could replan when a problem occurs in the Cryogenics Test Bed ("CTB"), which was developed by NASA Kennedy Space Center. CTB may be considered a separate controlled system than the controlled system described above for ADAPT. A person of ordinary skill in the art would readily appreciate that the embodiments described herein may apply to other controlled system not discussed herein. It should be appreciated that the Intelliface application, including any submodules, are not limited to ADAPT or CTB and may be applied to any testbed application or controlled system. For each module of the architecture, different technologies can be selected with the issue of interfaces remaining.

Intelliface/ADAPT

Figure 1:
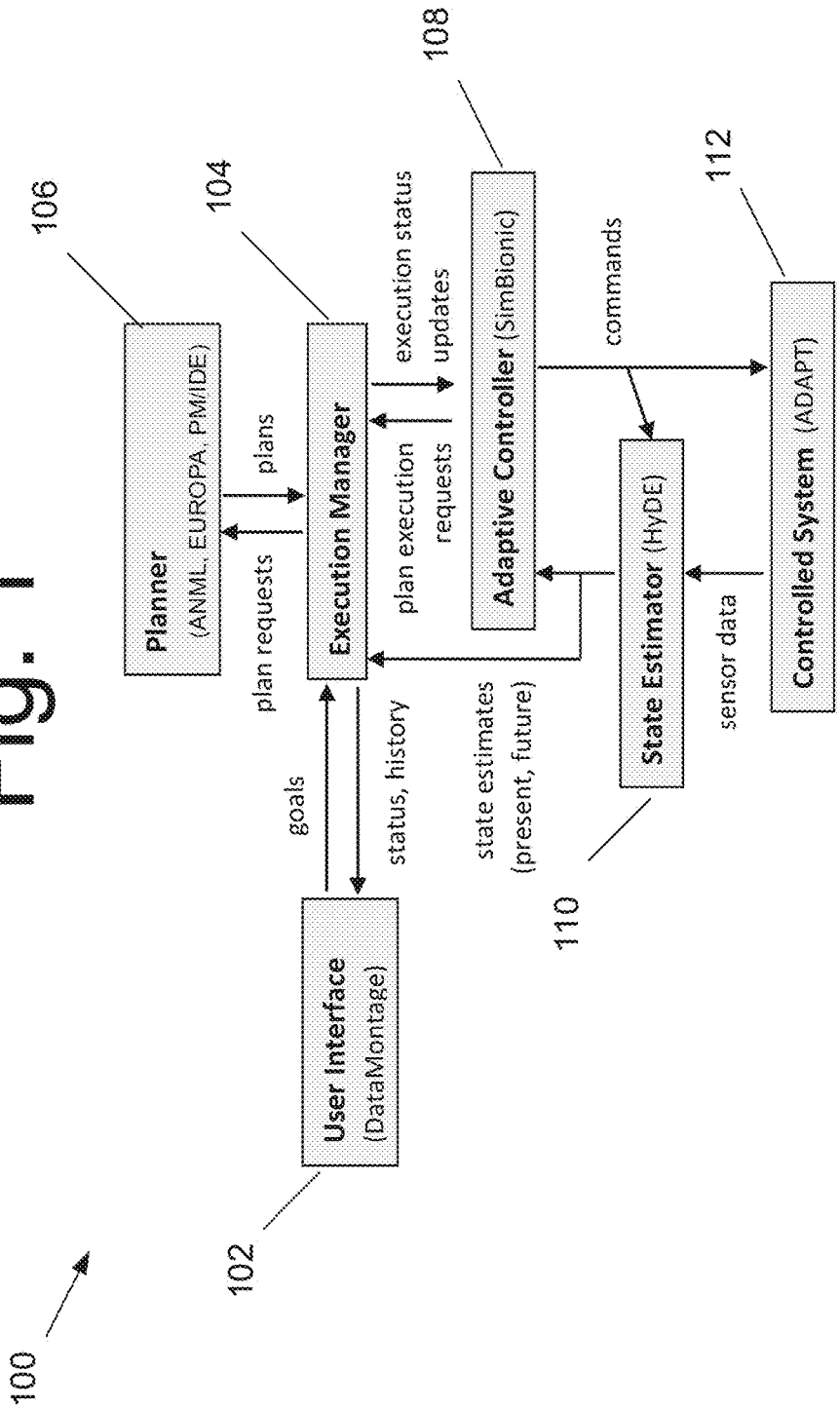
FIG. 1 is a block diagram illustrating an Intelliface/ADAPT architecture 100, according to an embodiment of the present invention.
Figure 2B:
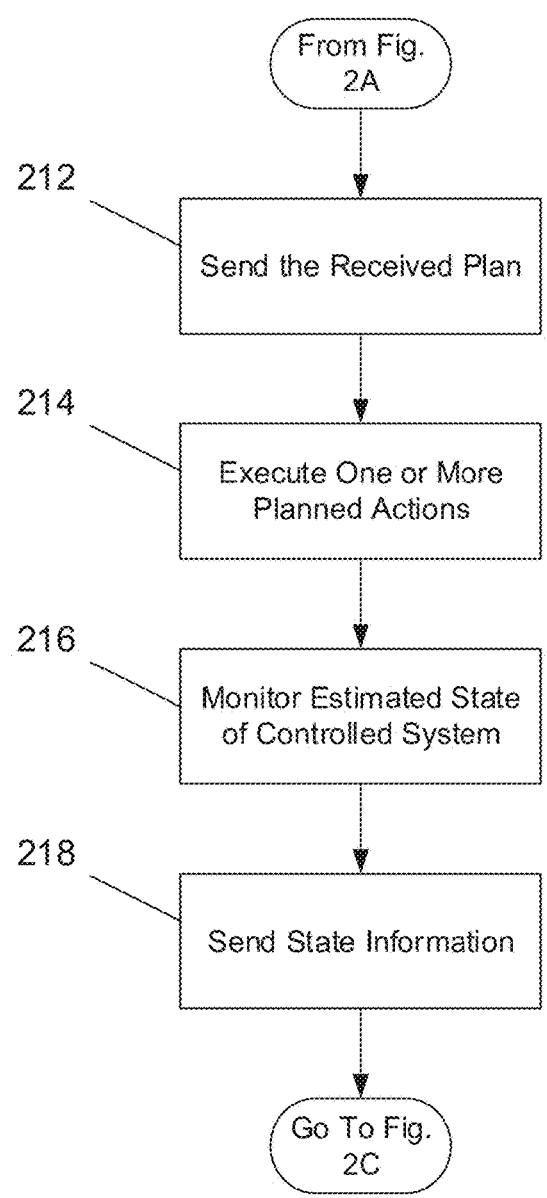
Figure 2C:
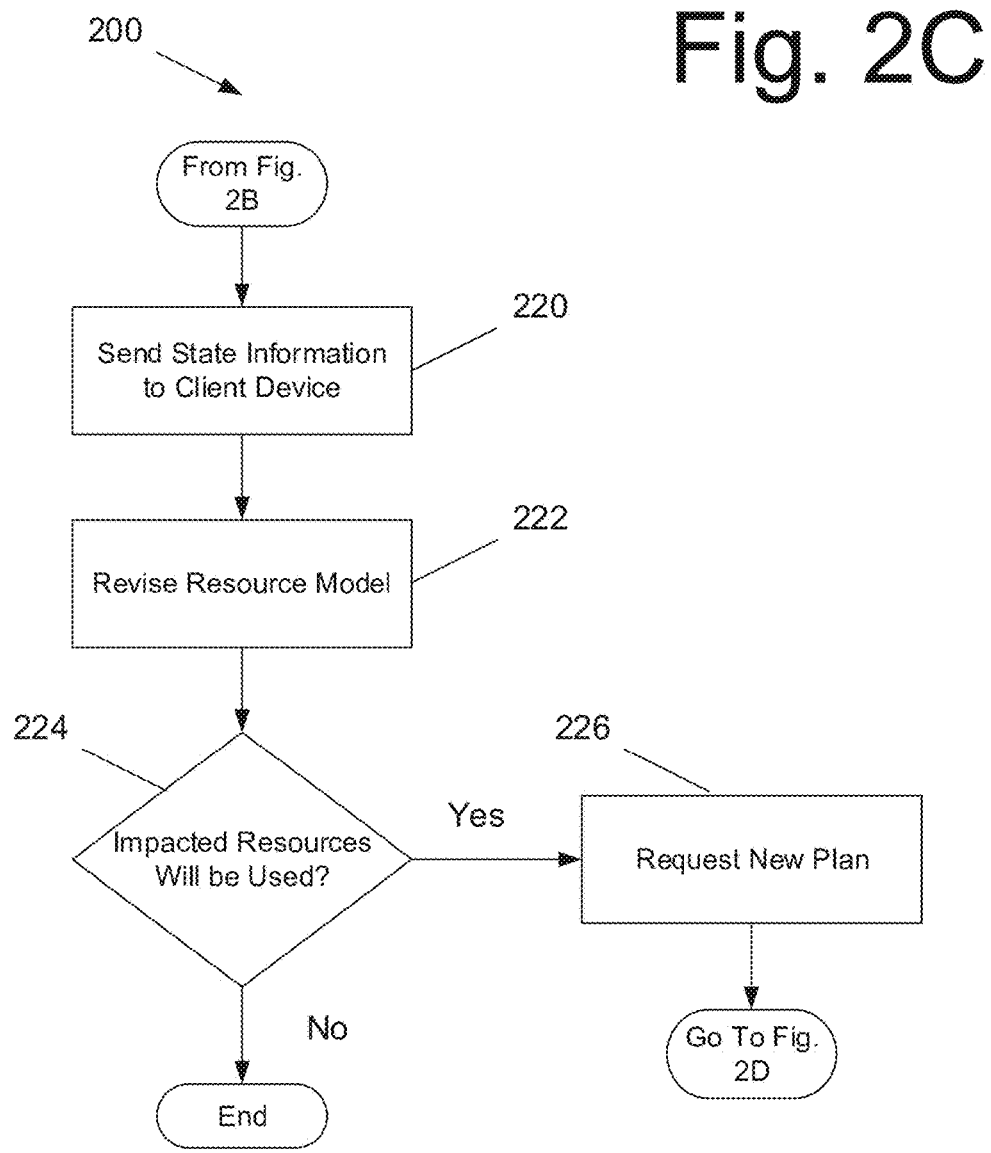
Figure 2D:
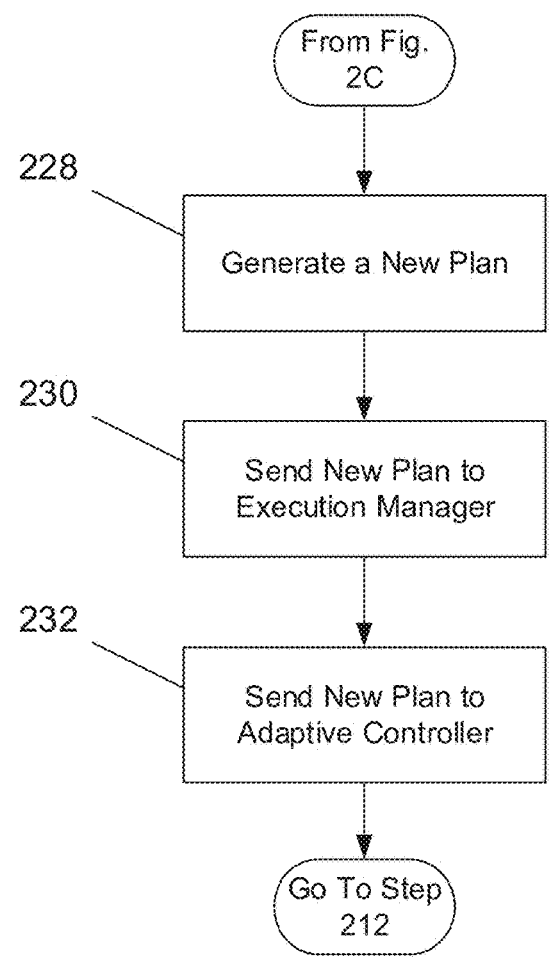

In certain embodiments, Intelliface/ADAPT detects and diagnoses faults injected into ADAPT (as part of the state vector), determines the impact of the fault on the capabilities of ADAPT, determines whether the impaired capabilities affect the system's ability to execute the current plan, and, if necessary, generates a new plan that can be carried out by the damaged system. FIG. 1 is a block diagram illustrating an Intelliface/ADAPT architecture 100, according to an embodiment of the present invention. In some embodiments, Intelliface/ADAPT architecture 100 may include one or more modules. For example, Intelliface/ADAPT may include an execution manager 104, which accepts goals and tasks from a user via user interface 102. User interface 102 may enable a user to send planning goals comprising experiment execution requests to execution manager 104. User interface 102 may also display the current plan in a Gannt chart and sensor data and commands in an array of graphs, timelines, and schematic display. See, for examples, FIGS. 3B-5.

Execution manager 104 in certain embodiments may also request a plan from planner 106, which may be used to achieve goals and perform the tasks, and may then request the execution of the plan by an adaptive controller 108. The plan request may specify the desired tasks to be performed and the state conditions to be achieved or maintained along with estimates of the current and future state of the controlled system. Planner 106 may either return a plan that satisfies the request or report a planning error. A planning error may be reported because planner 106 was unable to generate a valid plan that satisfied the request.

Execution manager 104 may also receive reports of unsuccessful execution from adaptive controller 108 and fault reports from the state estimator 110. In response to these reports, the execution manager 104 may request a new plan from the planner 106 and send the new plan to adaptive controller 108 for execution. Execution manager 104 in some embodiments may receive nominal and/or successful execution information at any time during the process of execution.

Adaptive controller 108 may execute each action specified by the plans received from execution manager 104 by, for example, sending commands to controlled system 112. During the execution of each action, the adaptive controller 108 may monitor the estimated state and use branching and looping logic to select or tailor alternate lower-level actions as appropriate. Adaptive controller 108 may notify execution manager 104 when a planned action cannot be executed or when other anomalous situations are detected during execution of the plan. For ADAPT, execution of an action that closes a relay might check the value of the relay position sensor to confirm that the relay indeed closed.

Commands may also be sent to state estimator 110 to help estimate the state of the system and the environment. In some embodiments, state estimator 110 may estimate the state of the controlled system. In one embodiment, state estimator 110 uses a diagnostic reasoning system to estimate the nominal or off-nominal mode of each component in the controlled system.

FIGS. 2A-2D are flow diagrams illustrating a process 200 for executing a plan, according to an embodiment of the present invention. In some embodiments, the process may be executed by one or more modules within the computing system shown in FIG. 7.

The process in some embodiments may begin with an execution manager of the computing system receiving at 202 a planning system goals file(s) from a user's client device. The planning system goal file(s) may specify at least one goal, that is to be run, at least one deadline, and possibly, one or more other constraints. At 204, the execution manager may send a plan request to a planner. The plan request may include two parts—the planning goals and a description of the current and projected resource availabilities inferred from the current and projected state of ADAPT.

At 206, the planner may combine the planning request with static portions of a planning domain model to create a planning problem. The planning problem may be expressed, for example, in ANML. The planning problem may be sent to an automated planner module in some embodiments. At 208, the execution manager may receive a plan from the planner, satisfying the plan request, or receive a planning error. A planning error may be reported when the planner is unable to generate a valid plan that satisfies the plan request. If a planning error is received, then at 210, the execution manager may submit a revised plan request to the planner.

If, however, a plan is received, then at 212, the execution manager may send the plan to an adaptive controller for execution. Because the plan may include one or more planned actions, the adaptive controller may execute at 214 each planned action in the plan by running one or more augmented finite state machines (FSMs). The FSM may send one or more commands to a controlled system, or in this example controlled system, ADAPT. In some embodiments, when the start time of each planned action is reached, the adaptive controller may initiate the appropriate augmented FSM to execute the action. The adaptive controller may track states and events, and even perform actions in parallel by running multiple FSMs simultaneously in some embodiments.

It should be appreciated that in some embodiments, during execution of each planned action, the adaptive controller may monitor the sensed data and the estimated state from the state estimator and may use a branching looping logic to select or tailor alternate lower-level actions as appropriate.

In some further embodiments, the adaptive controller may notify the execution manager when the adaptive controller is unable to execute a planned action or when the adaptive controller detects one or more anomalous conditions during execution of the planned action. In the example of ADAPT, execution of a planned action that closes a relay might check a value of the replay position sensor to confirm that the relay closed.

In certain embodiments, the adaptive controller may send commands to the state estimator. The state estimator in such embodiments may compare sensed and commanded states in order to detect and diagnose problems. For example, if the state estimator sends a command to close a relay, the commanded state is that the relay is closed. If the relay's position sensor reports that the relay is open, the sensed state is an open relay. In this example, a discrepancy between the sensed and commanded states may suggest a problem in the relay or in the relay position sensor.

It should be appreciated that during the execution of each planned action, the controlled system may respond to commands received by opening and closing relays to provider power to pumps, lights, and fans, for example. In the example of ADAPT, the controlled system may continuously output data from current, voltage, flow rate, and other sensors.

At 216, while the controlled system executes each planned action, the state estimator may estimate the state of the controlled system. For example, the state estimator may embed a diagnostic reasoning system that diagnoses faults in the controlled system based on sensor data and commands received from the controlled system. It should be appreciated that while the steps 212, 214, and 216 are shown in a sequential form, these steps may be performed in any manner, i.e., sequentially, alternatively, concurrently, etc. At 218, the state estimator may send state information, including any detected faults, of the controlled system to the execution manager and the adaptive controller.

At 220, when the state information is received, the execution manager may send the state information to the user's client device. The user interface of the client device in some embodiments may display the state information, including the current plan and sensor data, in, for example, Gannt charts, timelines, and time-series graphs, as well as any other embodiment that would or could be readily appreciated by a person of ordinary skill in the art. The state information may also include any faults that are detected.

If faults are detected, then at 222, the execution manager may revise the resource model based on the diagnosed fault(s) and compile a list of resources believed to have become unavailable. At 224, the execution manager may determine if there are one or more planned actions that use or may use any of the impacted resources. If the execution manager determines that there are one or more planned actions that use or may use any of the impacted resources, then at 226, the execution manager may request the planner to generate a new plan that avoids using any of the unavailable resources. Otherwise, the process may end or continue to monitor the controlled system.

At 228, the planner may generate the new plan responsive to the request, and at 230, send the new plan to the execution manager. The execution manager at 232 may then send the new plan to the adaptive controller for execution, and the process may restart back at 212.

It should be appreciated that one or more steps in the process described in FIGS. 2A-2D may be executed in any order that would be appreciated by a person of ordinary skill in the art. This order may include execution of the one or more steps sequentially, simultaneously, etc.

It should also be appreciated that a user may inject a failure into the controlled system anytime during the execution of the generated plan or revised plan. For example, in an operational (or experimental) system, fault(s) could occur at any time during the execution of the generated or revised plan. It should be appreciated that the Gannt chart may display the new and order plans allowing the user to compare both plans.

ADAPT

Figure 3A:
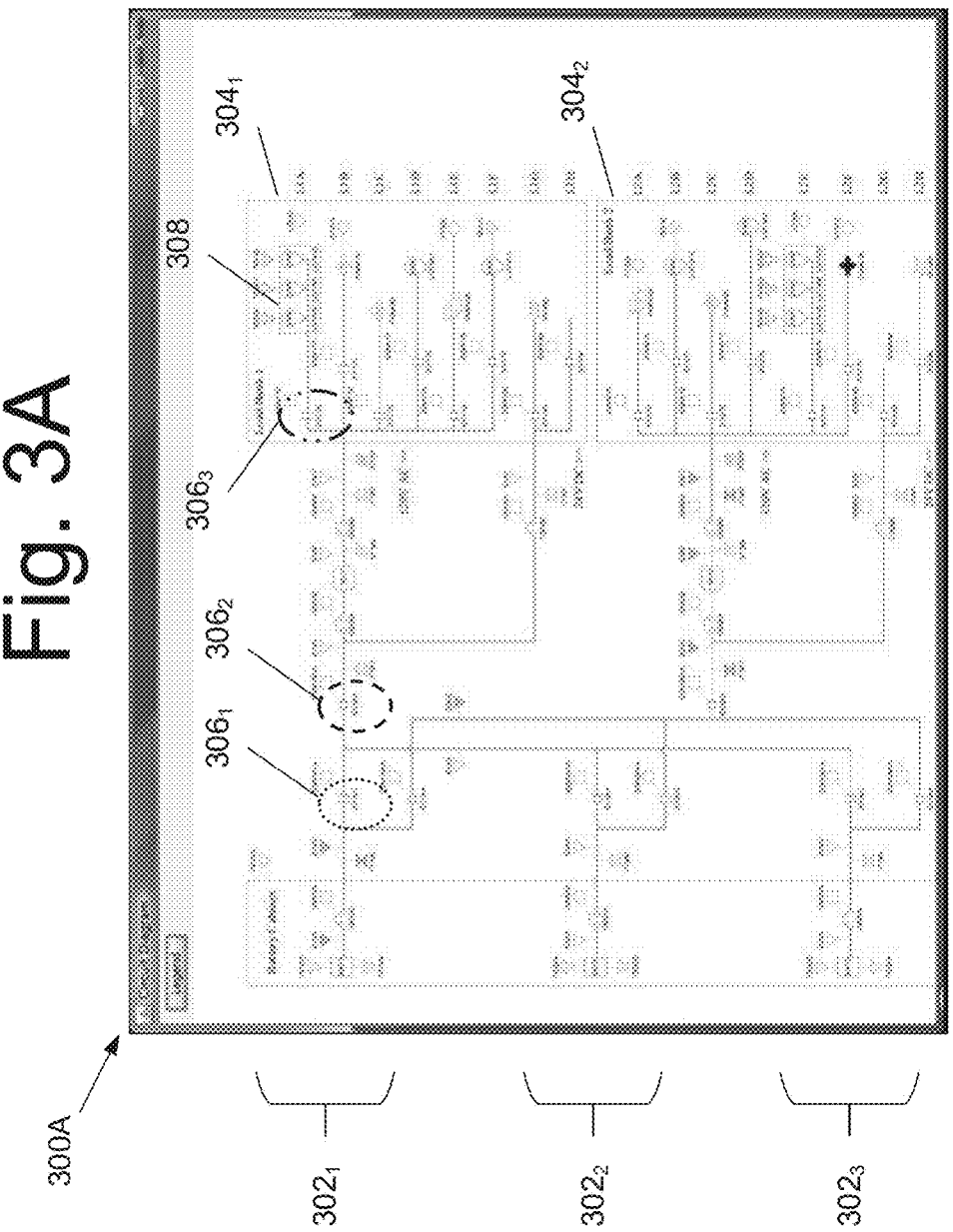
FIG. 3A is a graphical user interface illustrating a schematic diagram of a candidate controlled system (hereinafter "controlled system"), according to an embodiment of the present invention.

FIG. 3A is a graphical user interface 300A illustrating a schematic diagram of a controlled system, according to an embodiment of the present invention. In some embodiments, the controlled system may be the ADAPT testbed. ADAPT in some embodiments is an electrical system that includes batteries $302_1$, $302_2$, $302_3$ and load banks $304_1$ and $304_2$. Load banks $304_1$ and $304_2$ may include a collection of electrical loads in some embodiments. Controlled system may also include inverters, relays $306_1$, $306_2$, $306_3$, circuit breakers, electrical wires, and sensors.

It should be appreciated that in some embodiments electrical load banks $304_1$, $304_2$ may include fans, pumps, and lights. Relays may open or close to establish electrical paths between batteries $302_1$, $302_2$, $302_3$ and load banks $304_1$, $304_2$. Inverters may in some embodiments convert, for example, a 24V direct current (DC) power provided by batteries $302_1$, $302_2$, $302_3$ to 120V AC power required by load banks $304_1$, $304_2$. Circuit breakers in certain embodiments may open when excessive current flows in order to protect the other components.

Each battery $302_1$, $302_2$, $302_3$ may provide power to all of the loads in a single load bank $304_1$ or $304_2$. Relays may link either of load bank $304_1$, $304_2$ to any battery $302_1$, $302_2$, $302_3$. In this example, because there are three batteries $302_1$, $302_2$, $302_3$, it may be possible to power both load bank $304_1$, $304_2$, even when one of the three batteries $302_1$, $302_2$, $302_3$ is inoperative. Thus, redundant batteries and electrical paths enable the electrical system to be configured so that loads can be powered even when faults occur.

Additional relays may control whether power is supplied to individual loads within each load bank $304_1$, $304_2$. For example, relay $306_3$ may control whether power is supplied to lights 308, assuming that power is supplied to load bank $304_1$. Thus, to provide power from battery $302_1$ to lights 308, relays $306_1$, $306_2$, $306_3$ should all be closed and operational. In other words, relays $306_1$, $306_2$, $306_3$ should not be in a fault state.

The ADAPT testbed was designed primarily to support research in automated diagnosis and advanced user interfaces that support diagnosis by crew members. From a diagnosis perspective, the devices were simply loads that are powered by the electrical distribution system. However, to use ADAPT as a testbed for automated planning, hypothetical activities were constructed that use these devices, as well as constraints on those activities. In one example, load bank $304_1$ powered devices located in Room 1, and load bank $304_2$ powered devices in Room 2. A similar process of developing hypothetical activities can occur in other candidate domains.

As shown in Table 1, the following activities may require the use of loads in load bank $304_1$ in this example:

| Function (Hypothetical Activities) | Behavior/Structure |
| --- | --- |
| Dim Lighting in Room 1 | At least 50 W of light in Room 1 |
| Bright Lighting in Room 1 | At least 100 W of light in Room 1 |
| Min cooling in Room 1 | Small fan on in Room 1 |
| Medium cooling in Room 1 | Large fan on in Room 1 |
| Max cooling in Room 1 | Both small and large fan on in Room 1 |

-continued

| Function (Hypothetical Activities) | Behavior/Structure |
|---|---|
| Crew Task A in Room 1 Lighting in Room 1 | Simultaneous Min cooling in Room 1 + Dim |
| Crew Task B in Room 1 Lighting in Room 1 | Simultaneous Max cooling in Room 1 + Bright |
| Crew Task C in Room 1 Lighting in Room 1 | Simultaneous Max cooling in Room 1 + Dim |

Similar activities may use loads in load bank $304_2$ for lighting, cooling, and crew tasks in Room 2. In this example, as shown in table 2 the following activities use loads in either load banks or load bank $304_2$:

| Function (Hypothetical Activity) | Behavior/Structure |
|---|---|
| Crew Task D in either room | Simultaneous Medium cooling + Bright Lighting in the same room |
| Light Pump Activity | Requires the use of either pump for some period of time. The flexibility of using either pump presumes that valves (not modeled) can connect either pump to the fluid to be pumped. |
| Heavy Pump Activity | Requires use of both pumps for some period of time |
| Critical Light Pump Activity | Requires the use of either pump as well as the ability to monitor its flow rate (e.g., the pump's flow rate sensor must be operational). |
| Critical Heavy Pump Activity | Requires the use of both pumps and the ability to monitor their flow rates (e.g., the pump's flow rate sensor must be operational). |

Also, in this example, table 3 lists experiments that require the following sequences of activities:

| Hypothetical Experiment | Activities |
|---|---|
| Experiment A | Crew Task A in Room 1 + Light Pump Activity + Crew Task B in Room 1 |
| Experiment B | Crew Task A in Room 2 + Heavy Pump Activity + Crew Task B in Room 2 |
| Experiment C | Crew Task A in Room 2 + Critical Light Pump Activity + Crew Task C in Room 2 |
| Experiment D | Crew Task A in Any Room + Critical Heavy Pump Activity + Crew Task C in Same Room |

The operating rules in this example are as follows. First, each load bank can be powered by zero or one battery, and second, each battery can be connected to zero or one load bank. It should be appreciated that a different set of operating rules may be used. For example, the set of operating rules may allow a single battery to power some loads in both load banks as long as the total power required by the loads is within the battery's limit.

User Interface

The user interface in some embodiments may enable users to send planning goals and tasks to the execution manager. The user interface may also display the current plan in a Gannt chart and sensor data and commands in an array of graphs and timelines. See, for example, FIG. 3B, which is a graphical user interface 300B illustrating polygons that group components associated with each planning resource, overlaid over the circuit diagram of the controlled system, according to an embodiment of the present invention.

In this example, rectangles or polygons 310 show resources in use, and rectangle or polygon 312 shows a resource that is inoperative, according to the state estimator. Rectangles or polygons 316 show several resources identified by the state estimator in an ambiguous diagnosis as possibly inoperative. The circle 314 highlights a component that has faulted. In this example, relay $306_1$ has faulted, inferring that the connection resource between battery $302_1$ and load bank $304_1$ is inoperative. The loads in load bank $304_1$ may be powered by battery $302_2$ in some embodiments.

In other words, the overlaid polygons 310, 312, and 316 each show a set of electrical components that are associated with each resource. The state estimator may identify problems with the set of electric components. Execution manager may infer which resources are available and unavailable from the state, thus allowing the planner to reason about the resources required by each action. The association between components and resources enables in some embodiments the translation from component failures identified by the state estimator to the unavailability of resources that the planner cares about.

Figure 4:
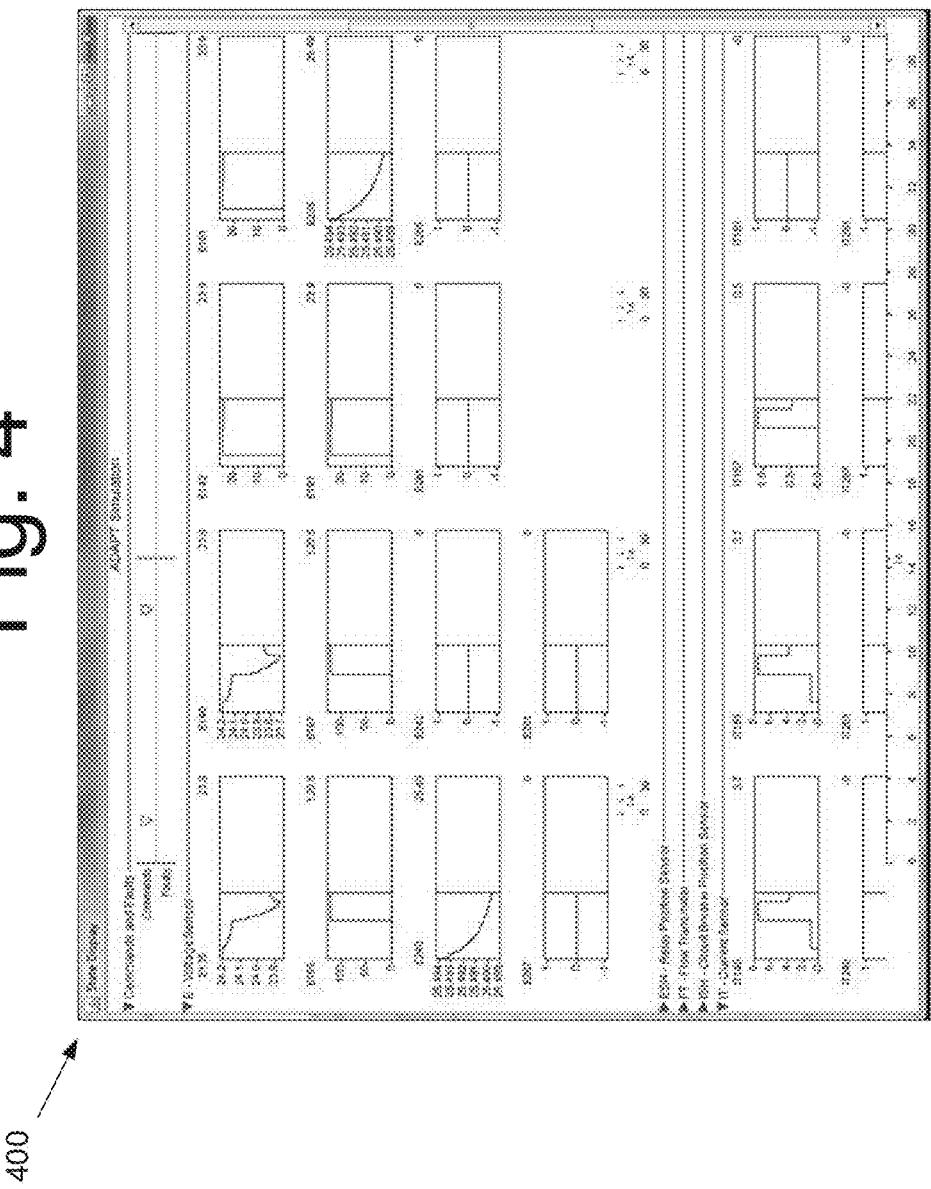
FIG. 4 is a graphical user interface 500 illustrating a graph and timeline display of ADAPT, according to an embodiment of the present invention.

FIG. 4 is a graphical user interface 400 illustrating a graph and timeline display of ADAPT, according to an embodiment of the present invention. In graphical user interface 400, sensor data and command, i.e., input and output of controlled system 112 of FIG. 1, are displayed in an interactive array of graphs and timelines. Each graph or timeline may display the time-series values reported continuously by a sensor or the timing of commands sent to the controlled system. Graphical user interface 400 may allow a user to zoom and scroll within the graphs and timelines in unison. This information-dense display may enable the user to see patterns and trends spanning many variables. The vertical line dropped through all of the displays signifies the current time.

Figure 5:
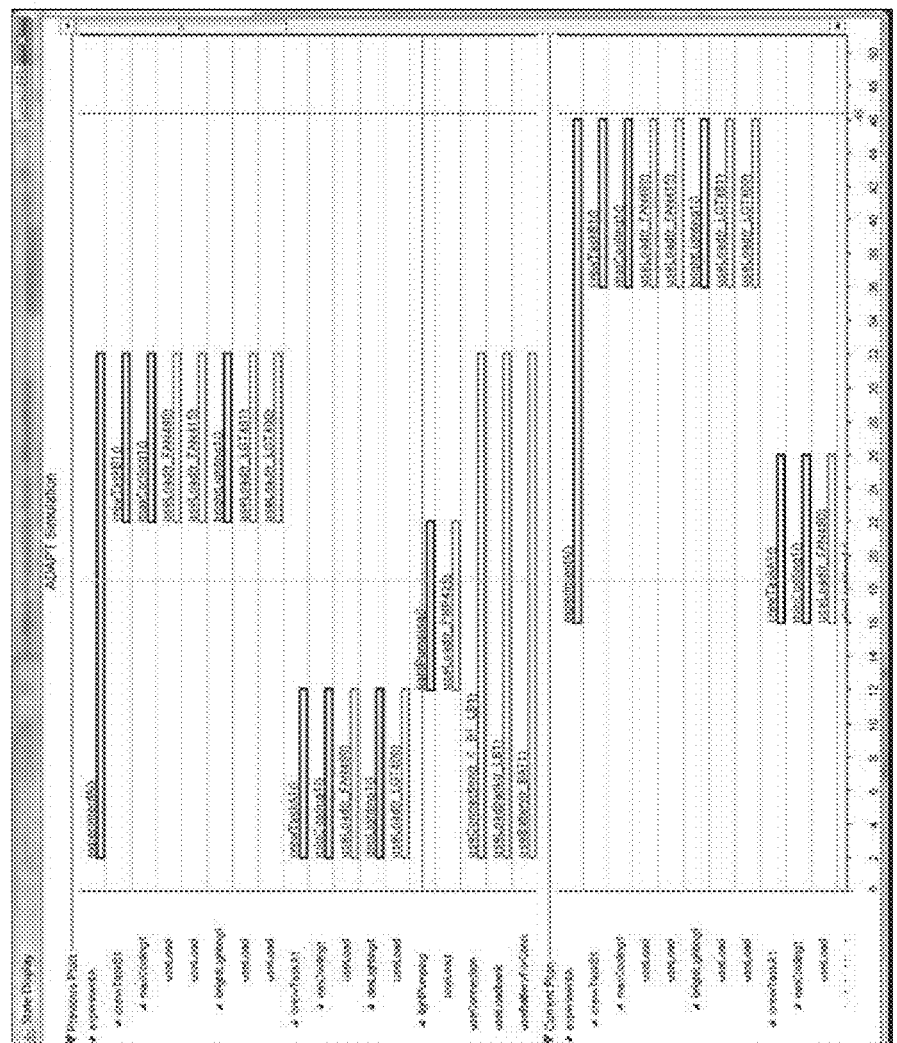
FIG. 5 is a graphical user interface 500 illustrating a Gannt chart for ADAPT (or the controlled system), according to an embodiment of the present invention.

FIG. 5 is a graphical user interface 500 illustrating a Gannt chart for ADAPT, according to an embodiment of the present invention. In this example, graphical user interface 500 may allow a user to compare a previous plan with a current plan, generally after re-planning has been requested. Graphical user interface 500 in some embodiments use horizontal bars to shows the times when a particular type of action, as specified by an ANML action definition, is scheduled for execution, to represent high-level actions, which decompose into lower level actions, and to represent lowest-level actions that have no sub-actions. For example, a horizontal bar may show an action that can no longer be executed because some of its required resources are no longer available. The user interface's hierarchical timeline feature enables users to open or close timelines. Opening a timeline displays allows for additional lower-level timelines to be shown immediately below and illustrate when lower-level sub-actions are scheduled. As mentioned above, the vertical line dropped through the GANTT chart signifies the current time and also is synchronized with the vertical lines in FIG. 4.

Planner

ANML is a planning domain modeling language that was developed at NASA Ames Research Center. ANML models specify fluents, which represent the state of world as discrete or continuous time-varying variables and functions. For example, the following declares a time-varying function that represents the location of each robot:

fluent Location atLocation(robot r);

ANML actions assign values to fluents to specify effects on world and specify Boolean conditions that refer to these fluents. For example, the following action specifies the condition that the battery level must be greater than 0 when the action begins to execute. At the end of the action's execution, an effect is that the battery level is set to 100:

```
action recharge(Robot robot) {
    [start] batteryLevel(robot)>0;
    [end] batteryLevel(robot):=100;
}
```

ANML actions have quantitative durations and can optionally decompose into sub-actions. For example, the following action decomposes into two sub-actions, calibrate and getImage, which are executed sequentially:

```
action takeImage(Robot robot, Location location) {
    duration:=10;
    [all] contains
        ordered(
            calibrateCamera(robot),
            getImage(robot, location));
}
```

Because ANML is an expressive, high-level planning language, it may be easier to generate ANML models, both manually and automatically, compared to lower-level languages such as the New Domain Definition Language (NDDL), used by NASA's EUROPA planner. An ANML→NDDL translator may be used to translate ANML models to NDDL. The translated models may then be used as inputs to the EUROPA planner for plan generation. See, for example, FIG. 6, which is a block diagram illustrating a planning subsystem 600, according to an embodiment of the present invention.

In some embodiments, planning model integrated development environment (IDE) 602 may provide interactive textual and graphical displays that help users enter, review, test, and repair planning domain models more quickly and effectively.

In some embodiments, system resource model to ANML code generator 604 may receive an input, e.g., a multi-sheet Microsoft Excel spreadsheet. This resource model provides a declarative description of the resource types, resource instances, mutual exclusion constraints that prevent two resources from being used at the same time, and dependencies among resources. In some embodiments, a code generator may translate this resource model into ANML statements. The ANML statements may include the static portion of the planning domain model, which describes the resources required by actions.

The static portion of an ANML model 606 may include action definitions, constraints, and fluent definitions in some embodiments that are relatively constant. The static portion of ANML model 606 may exclude statements about the current state of the system or world that change with time.

State to ANML code generator module 608 may translate a list of failed components and their fault modes into ANML statements specifying the reduced availability of ADAPT resources. In some embodiments, every functional (non-sensor) component is associated with a resource, and a resource is assumed to be unavailable if any of its components have faulted. In other embodiments, the determination of unavailable or degraded resources may be more complex. ANML to NDDL translation module 610 may translate the planning request and domain model, encoded in the ANML language, to a planning problem and domain model encoded in the NDDL language.

EUROPA planning system 612 may accept the NDDL model and planning request and automatically generate a planning solution, encoded in a data structure called timelines. EUROPA timelines to plans module 614 may translate timelines into a format that is understood by adaptive controller.

Adaptive Controller

An adaptive controller may execute each action in the plan by selecting and sending a sequence of commands to the controlled system or ADAPT. The adaptive controller may also use conditional logic to modify the selection or sequencing of commands in response to the state of the controlled system or of the world to adjust how actions are performed in particular situations. Adaptive controller may further monitor execution to confirm successful achievement of target state conditions or completion of planned actions. If execution problems occur, the adaptive controller reports these problems to a human operator and/or automated execution manager.

State Estimator

The state estimator in some embodiments estimates the past, present, and/or future state of the controlled system and the world based on its analysis of sensor data, commands, and other information through the internal models of the state estimator State estimator may include diagnostic systems, which analyze sensor readings, commands, and other data to identify faulty components and their fault states. Diagnostic output can be thought of as a state vector, where each element in the vector specifies the fault state of a particular component. For nominal components, elements of the state vector will be nominal states (vs. failure states). Diagnostic systems identify faulty subsystems and components in sufficient detail to enable other processes to determine the system's reduced functionality and performance. In other words, risks to the crew, vehicle/habitat, or mission can be identified and plans can be revised as necessary. In some embodiments, more than one state vector may be consistent with, for example, the sensed data and commands at a point in time. This is due to the fact that diagnosis is often an example of a non-unique inverse, where there are usually far greater number of failures modes than sensors. In addition, diagnosis can occur at different levels of detail from components to full systems.

In addition, diagnoses should be specific to support restoration of system functions. For example, a specific diagnosis that identifies a replaceable unit is more helpful for repair than a diagnosis that identifies the subsystem containing the unit. The state estimator module's diagnostic function is provided by a NASA-developed diagnostic reasoning system in some embodiments that was implemented using NASA's Hybrid Diagnostic Engine (HyDE), for example. The Intelliface/ADAPT state estimation system may be enhanced in the future to provide prognostics that estimate the type and timing of future failures. State estimator may estimate when repairs will complete, enabling a subsystem to resume operations.

Figure 7:
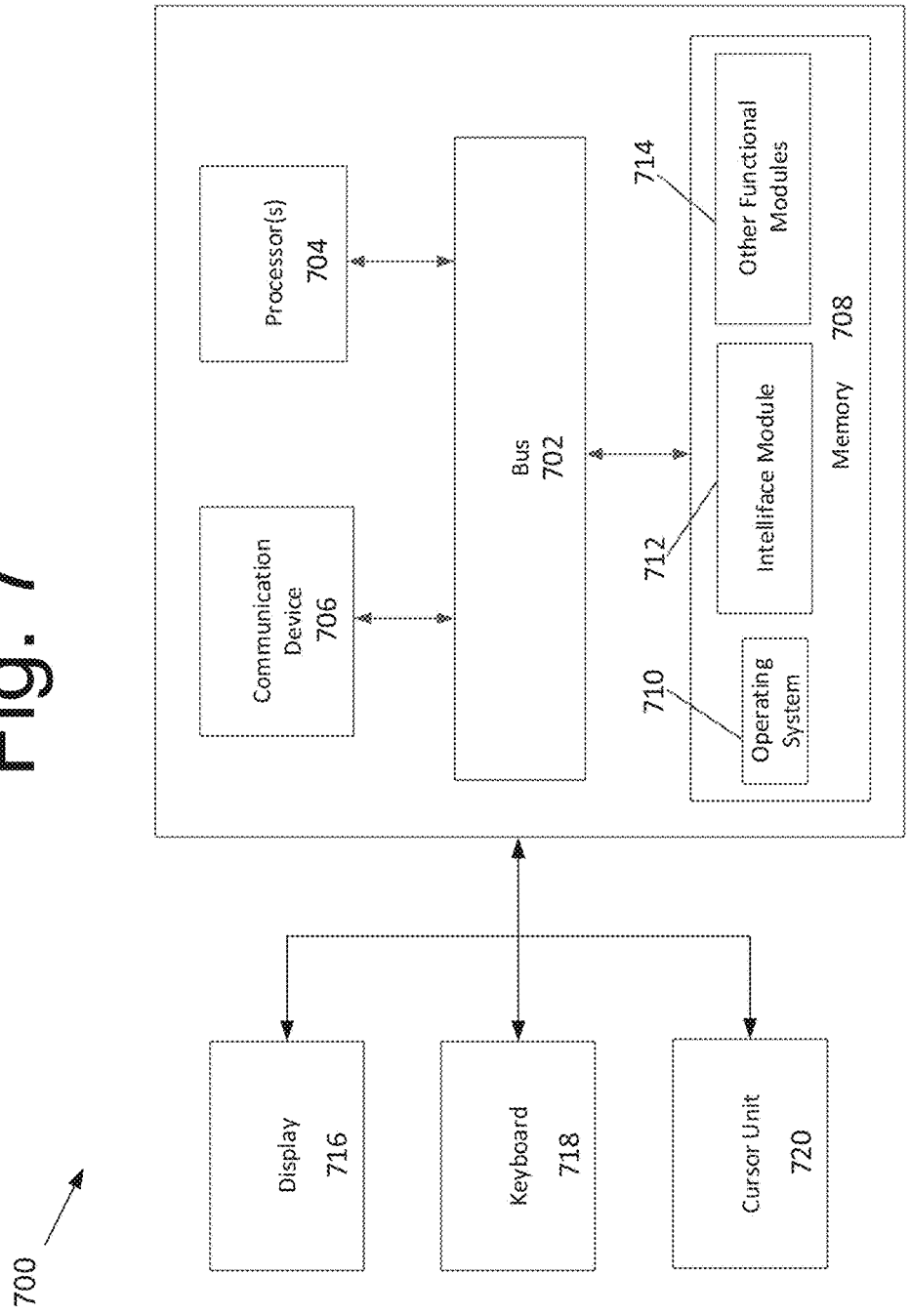
FIG. 7 is a block diagram illustrating a computing system for interfacing diagnosis and planning systems of a testbed, according to an embodiment of the present invention.

FIG. 7 is a block diagram illustrating a computing system 700 for interfacing diagnosis and planning systems of a testbed, according to an embodiment of the present invention. Computing system 700 includes a bus 702 or other communication mechanism for communicating information, and processor(s) 704 coupled to bus 702 for processing information. Processor(s) 704 may be any type of general or specific purpose processor, including a central processing unit ("CPU") or application specific integrated circuit ("ASIC"). Processor(s) 704 may also have multiple processing cores, and at least some of the cores may be configured to perform specific functions. Multi-parallel processing may be used in some embodiments. Computing system 700 further includes a memory 708 for storing information and instructions to be executed by processor(s) 704. Memory 708 can be comprised of any combination of random access memory (RAM), read only memory (ROM), flash memory, cache, static storage such as a magnetic or optical disk, or any other types of non-transitory computer-readable media or combinations thereof. Additionally, computing system 700 includes a communication device 706, such as a transceiver and antenna, to wirelessly provide access to a communications network.

Non-transitory computer-readable media may be any available media that can be accessed by processor(s) 704 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 704 are further coupled via bus 702 to a display 716, such as a Liquid Crystal Display (LCD), for displaying information to a user. A keyboard 718 and a cursor control device 720, such as a computer mouse, are further coupled to bus 702 to enable a user to interface with computing system. However, in certain embodiments such as those for mobile computing implementations, a physical keyboard and mouse may not be present, and the user may interact with the device solely through display 716 and/or a touchpad (not shown). Any type and combination of input devices may be used as a matter of design choice.

Memory 708 stores software modules that provide functionality when executed by processor(s) 704. The modules include an operating system 710 for computing system 700. The modules further include an Intelliface module 712 and other functional modules 714. Additional functional modules may include an execution manager, a planner, an adaptive controller, and a state estimator.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 2A-D may be performed by a computer program, encoding instructions for the nonlinear adaptive processor to perform at least the processes described in FIGS. 2A-D, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 2A-D, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

One or more embodiments of the invention generally support fault-tolerant autonomy by enabling an automated planning system, state estimator, and adaptive controller to work together to execute plans generated by the planning system, detect and diagnose problems and other conditions relevant to system operations, generate a new plan that accommodates the new conditions, and resume operation using the new plan. Additionally, one or more embodiments of the invention may also simplify system operations and logistics, configuration management including upgrades, and testing by enabling the replacement of a module by another module or a more improved module of similar function with a similar interface. The one or more embodiments described herein may streamline the development and maintenance of integrated intelligent subsystems by automatically generating knowledge models used by each subsystem from common knowledge bases.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
   transmitting, by an execution manager, a request to a planner to create a plan in response to receiving a planning problem, wherein the planning problem comprises one or more goals, one or more state estimates, or both;
   transmitting, by the execution manager, the created plan to an adaptive controller for execution of the created plan within a controlled system;
   wherein the step of transmitting the request to the planner to create a plan includes:
      translating, by the planner, the planning problem into statements written in a first planning domain modeling language;
      encoding a planning domain model in the first planning domain modeling language;
      translating, by the planner, the planning problem and the planning domain model encoded in the first planning domain modeling language to a planning problem and a domain model encoded in a second planning modeling domain language; and
      generating, by the planner, a planning solution encoded in a data structure using the planning problem and a planning domain model encoded in the planning domain modeling language, wherein the planning solution specifies a type and timing of actions that achieve the one or more planning goals;
   receiving, by the execution manager, one or more state estimates reporting diagnosis information of the controlled system from a state estimator; and
   when one or more faults are detected in the one or more state estimates, revising a resource model comprising a plurality of resources based on the one or more detected faults, by the execution manager, wherein
      the resource model provides a declarative description of resource types, resource instances, mutual exclusion constraints that prevent two resources from being used at the same time, and dependencies among the plurality of resources;
      each resource of the plurality of resources is a physical factor necessary to carry out one or more activities associated with the plan; and
      at least one resource of the plurality of resources has a quantity or an availability that is sufficiently limited to require allocation of the at least one limited resource.

2. The computer-implemented method of claim 1, further comprising:
   determining, by the execution manager, whether the created plan is feasible or problematic using the reported diagnosis information of the controlled system or information received from the adaptive controller regarding execution of the plan.

3. The computer-implemented method of claim 2, further comprising:
   transmitting, by the execution manager, a request to the planner for a revised plan in response when the created plan is determined not feasible or problematic.

4. The computer-implemented method of claim 1, further comprising:
   compiling, by the execution manager, a list of resources considered to have become unavailable based on the one or more detected faults.

5. The computer-implemented method of claim 1, further comprising:
   determining, by the execution manager, whether one or more planned actions use resources impacted by the one or more detected faults; and
   when the execution manager determines that the one or more planned actions use the resources impacted by the one or more detected faults, requesting, by the execution manager, for the planner to generate a new plan that avoids using any of the impacted resources.

6. The computer-implemented method of claim 1, further comprising:
   creating, by the planner, the plan in response to the request received from the execution manager; and
   returning, from the planner, the created plan to the execution manager.

7. The computer-implemented method of claim 1, wherein the planning domain modeling language comprises Action Notation Modeling Language (ANML) statements.

8. The computer-implemented method of claim 1, wherein the planning domain modeling language comprises Action Notation Modeling Language (ANML) statements, and wherein the second planning domain modeling language comprises New Domain Definition Language (NDDL).

9. The computer implemented method of claim 1, wherein the creating of the plan further comprises:
translating, by the planner, the planning solution into an input format required by the adaptive controller.

10. The computer-implemented method of claim 1, wherein the plurality of resources comprise both directly and indirectly used resources in the resource model of the controlled system.

11. The computer-implemented method of claim 1, further comprising:
revising the planning domain model, by the planner, to account for availability and consumption of resources and ensure that plans allocate their use effectively when a resource becomes limited relative to demand such that the resource must be allocated.

12. The computer-implemented method of claim 1, wherein each resource of the plurality of resources is one or more of a durable object, including equipment or facilities, or a consumable resource, including material, energy, labor, personnel, space, or land.

13. An apparatus, comprising:
at least one processor; and
memory comprising a set of instructions, wherein
the set of instructions, with the at least one processor, cause the apparatus to:
transmit a request to a planner to create a plan in response to receiving a planning problem, wherein the planning problem comprises one or more goals, one or more state estimates, or both;
wherein causing the apparatus to transmit a request to the planner to create the plan includes causing the apparatus to:
translate, by the planner, the planning problem into statements written in a first planning domain modeling language;
encode, a planning domain model in the first planning domain modeling language;
translate, by the planner, the planning problem and the planning domain model encoded in the first planning domain modeling language to a planning problem and a domain encoded in a second planning domain modeling language; and
generate a planning solution encoded in a data structure using the planning problem and a planning domain model encoded in the second planning domain modeling language, wherein the planning solution specifies a type and timing of actions that achieve the one or more planning goals;
transmit the created plan to an adaptive controller for execution of the created plan within a controlled system;
receive the one or more state estimates reporting diagnosis information of the controlled system from a state estimator; and
when one or more faults are detected in the one or more state estimates, revise a resource model comprising a plurality of resources based on the one or more detected faults, wherein the resource model provides a declarative description of resource types, resource instances, mutual exclusion constraints that prevent two resources from being used at the same time, and dependencies among the plurality of resources;
each resource of the plurality of resources is a physical factor necessary to carry out one or more activities associated with the plan; and
at least one resource of the plurality of resources has a quantity or an availability that is sufficiently limited to require allocation of the at least one limited resource.

14. The apparatus of claim 13, wherein the set of instructions, with the at least one processor, cause the apparatus to:
determine whether the created plan is feasible or problematic using the reported diagnosis information of the controlled system or information received from the adaptive controller regarding execution of the plan.

15. The apparatus of claim 14, wherein the set of instructions, with the at least one processor, cause the apparatus to:
transmit a request to the planner for a revised plan in response when the created plan is determined not feasible or problematic.

16. The apparatus of claim 13, wherein the set of instructions, with the at least one processor, cause the apparatus to:
compile a list of resources considered to have become unavailable based on the one or more detected faults.

17. The apparatus of claim 13, wherein the set of instructions, with the at least one processor, cause the apparatus to:
determine whether one or more planned actions use resources impacted by the one or more detected faults; and
when the execution manager determines that the one or more planned actions use the resources impacted by the one or more detected faults, request for the planner to generate a new plan that avoids using any of the impacted resources.

18. The apparatus of claim 13, wherein the set of instructions, with the at least one processor, cause the planner to:
create the plan in response to the request received from the execution manager; and
return the created plan to the execution manager.

19. The apparatus of claim 13, wherein
the first planning domain modeling language comprises Action Notation Modeling Language (ANML) statements.

20. The apparatus of claim 13, wherein the first planning domain modeling language comprises Action Notation Modeling Language (ANML) statements, and wherein causing the second planning domain language comprises New Domain Definition Language (NDDL).

21. The apparatus of claim 13, wherein the set of instructions, with the at least one processor, cause the planner to:
translate the planning solution into an input format required by the adaptive controller.

* * * * *